(12) United States Patent
Poulter

(10) Patent No.: US 8,608,021 B2
(45) Date of Patent: Dec. 17, 2013

(54) ROAD TANKER FLUID STORAGE TANK FILL COVER ASSEMBLY

(75) Inventor: Trevor Poulter, Leeds (GB)

(73) Assignee: Mechtronic Limited, Leeds (GB)

( * ) Notice: Subject to any disclaimer, the term of this patent is extended or adjusted under 35 U.S.C. 154(b) by 193 days.

(21) Appl. No.: 12/918,657

(22) PCT Filed: Feb. 23, 2009

(86) PCT No.: PCT/GB2009/050178
§ 371 (c)(1),
(2), (4) Date: Aug. 20, 2010

(87) PCT Pub. No.: WO2009/104024
PCT Pub. Date: Aug. 27, 2009

(65) Prior Publication Data
US 2010/0326986 A1  Dec. 30, 2010

(30) Foreign Application Priority Data

Feb. 22, 2008  (GB) .................................. 0803249.2

(51) Int. Cl.
*B65D 90/34* (2006.01)
*B65D 90/10* (2006.01)

(52) U.S. Cl.
USPC .................. 220/810; 220/254.1; 220/203.01;
220/601; 220/4.12; 220/256.1; 220/366.1;
220/367.1; 105/377.01; 105/377.05; 105/377.11;
105/358; 137/584; 137/587; 137/589; 137/43

(58) Field of Classification Search
USPC ............ 220/254.1–254.9, 256.1, 259.1, 4.12,
220/601, 327, 825, 833, 845, 810, 319, 303,
220/366.1, 830, 86.2, 835, 371, 378;
137/584, 15.8, 526, 350, 39, 43; 52/20;
73/49.2; 292/256.73, 256.75, 256.69,
292/257; 215/260, 270, 271, 280, 381;
105/358, 337.07, 377.01, 377.05,
105/377.07; 16/221, 260; 404/25; 49/21
See application file for complete search history.

(56) References Cited

U.S. PATENT DOCUMENTS 1,776,168 A * 9/1930 Sweeley et al. .......... 105/377.07
2,014,861 A * 9/1935 Neely ........................ 220/259.2
(Continued)

FOREIGN PATENT DOCUMENTS

DE        3414827   * 10/1985  ............ B65D 90/34
DE     29910003 U1    9/1999
(Continued)

OTHER PUBLICATIONS

Notification Concerning Transmittal of International Preliminary Report on Patentability (Chapter 1 of the Patent Cooperation Treaty) dated Sep. 2, 2010 for related PCT Application No. PCT/GB2009/050178.

(Continued)

*Primary Examiner* — Mickey Yu
*Assistant Examiner* — Gideon Weinerth
(74) *Attorney, Agent, or Firm* — Ryan A. Schneider, Esq.; Troutman Sanders LLP

(57) ABSTRACT

A fill cover assembly for a liquid fuel storage tank of a road tanker, the assembly comprising: a seat member having a frame, the frame defining a fill aperture, the frame being configured to be fixedly coupled to a base plate of a liquid storage tank, the base plate having a plate aperture formed therein, thereby to form a fluid-tight seal between the seat member and the base plate around said plate aperture; and a fill-cover coupled to the tank and arranged to be moveable with respect to the frame between a closed condition in which a fluid-tight seal is formed between the fill-cover and the frame and an open condition in which fluid may be passed through said fill aperture to fill said storage tank, wherein the assembly is further arranged to allow venting of pressurized fluid from the liquid storage tank in the event that a pressure of the fluid exceeds a prescribed value.

31 Claims, 8 Drawing Sheets

(56) References Cited

U.S. PATENT DOCUMENTS

| | | | |
|---|---|---|---|
| 2,016,224 A | | 10/1935 | Bukolt |
| 3,060,962 A | * | 10/1962 | Graves .......................... 137/587 |
| 3,744,760 A | | 7/1973 | Uher |
| 4,388,873 A | * | 6/1983 | Carleton et al. ......... 105/377.11 |
| 4,655,365 A | * | 4/1987 | Miller .......................... 220/314 |
| 4,685,585 A | * | 8/1987 | Robbins .................... 220/256.1 |
| 4,819,830 A | * | 4/1989 | Schultz ......................... 220/371 |
| 5,135,024 A | * | 8/1992 | LeBlanc et al. ............... 137/529 |
| 5,158,022 A | * | 10/1992 | Dugge et al. ............. 105/377.07 |
| 5,184,422 A | * | 2/1993 | Wade et al. ..................... 49/239 |
| 5,246,027 A | | 9/1993 | Morris |
| 5,425,466 A | * | 6/1995 | Bambacigno ............ 220/203.09 |
| 5,460,285 A | * | 10/1995 | Harding, Sr. ............... 220/203.1 |
| 5,511,575 A | * | 4/1996 | Andenmatten et al. ......... 137/43 |
| 5,813,352 A | * | 9/1998 | Bramlett et al. ......... 105/377.07 |
| 5,937,581 A | | 8/1999 | Matye et al. |
| 5,967,358 A | * | 10/1999 | Adams et al. ............ 220/203.09 |
| 6,050,199 A | * | 4/2000 | Anderson et al. ........ 105/377.07 |
| 6,076,471 A | * | 6/2000 | Burian et al. ............ 105/377.07 |
| 6,085,664 A | * | 7/2000 | Early ....................... 105/377.07 |
| 6,318,402 B1 | | 11/2001 | Ladeira |
| 7,131,455 B2 | * | 11/2006 | Horban et al. ................ 137/350 |
| 8,397,646 B2 | * | 3/2013 | Blevins, Jr. ............. 105/377.08 |
| 2001/0017095 A1 | * | 8/2001 | Shaddle .................... 105/377.07 |
| 2002/0190068 A1 | | 12/2002 | Sisk et al. |
| 2008/0078127 A1 | | 4/2008 | Hill et al. |
| 2009/0158959 A1 | * | 6/2009 | Schultz et al. ........... 105/377.07 |
| 2010/0107926 A1 | * | 5/2010 | Drager .................... 105/377.07 |
| 2013/0008340 A1 | * | 1/2013 | Douglas et al. .......... 105/377.07 |

FOREIGN PATENT DOCUMENTS

| | | |
|---|---|---|
| DE | 20301263 U1 | 6/2004 |
| EP | 1717164 A1 | 11/2006 |
| EP | 1767469 A1 | 3/2007 |
| EP | 1965867 | 9/2008 |
| WO | 9742437 A1 | 11/1997 |
| WO | 03068634 A1 | 8/2003 |

OTHER PUBLICATIONS

In connection with corresponding European Patent EP2254771, documents submitted to the EPO with a Notice of Opposition, including the Statement and Ground of Opposition and the relevant cited art.

In connection with corresponding UK Patent Application GB0803249.2, a Search Report and the relevant cited art.

BS EN 14596:2005 "Tanks for transport of dangerous goods. Service equipment for tanks. Emergency pressure relief valve", Apr. 21, 2005.

BS EN 13317:2002 "Tanks for transport of dangerous goods. Service equipment for Tanks. Manhole cover assembly", Dec. 6, 2012.

BS EN 13314:2002 "Tanks for transport of dangerous goods. Service equipment for tanks. Fill hole cover", Dec. 6, 2002.

Notice of Opposition in EP2254771, May 10, 2012.

Statement and Ground of Opposition in EP2254771, May 10, 2012.

GB0803249.2 Search Report, Jun. 18, 2008.

* cited by examiner

ROAD TANKER FLUID STORAGE TANK FILL COVER ASSEMBLY

BENEFIT CLAIMS

This application is a US National Stage of International Application No. PCT/GB2009/050178, filed 23 Feb. 2009, which claims the benefit of GB 0803249.2, filed 22 Feb. 2008, both herein fully incorporated by reference.

FIELD OF THE INVENTION

The present invention relates to a fill cover assembly for a road tanker fluid storage tank. In particular but not exclusively the invention relates to an assembly having increased resistance to deformation due to sudden increases in pressure.

BACKGROUND

Fill covers are employed in the construction of tanker fluid storage tanks in order to allow filling of the storage tank by a tanker operative, typically by means of a hose attached to a fill arm. Fill covers are traditionally arranged to seal a fill aperture formed in a man-lid, the man-lid typically being a plate removably attached to a man-lid aperture formed in an upper wall of the storage tank. Removal of the man-lid allows improved access to an interior of the tank for maintenance and other operations.

Under UK regulations fill covers for fitting to road vehicles are required to be capable of preventing fluid leakage from a storage tank following a 'drop test' involving dropping of the tank from a prescribed height. The test is intended to simulate a sudden increase in pressure of the contents of the storage tank upon a road tanker rolling onto its side. Pressures of up to 126 psi have been recorded for non-pressurised liquid fuels contained within a storage tank of a road tanker under such test conditions.

The problem exists that catastrophic failure of the integrity of a seal between the fill cover and the storage tank can occur due to the sudden increase in pressure resulting in leakage of substantial amounts of fluid from the tank.

US2008/0078127 discloses a remotely actuated manhole system in which a cover is pivotable about a substantially vertical axis with respect to a frame secured with a collar on a bulk carrier. The cover is shiftable vertically between and to locked and unlocked conditions by an inflatable seal member below the cover. The system includes catches that prevent over-rotation of the cover from the open position to the closed position and the catches engage in the locked position by the vertical upward movement of the cover. The inflation of the seal member and the pivoting of the cover are remotely actuated.

EP1717164 discloses a cover and a filler for a tank truck. A fill cover is hingedly coupled directly to a wall of a liquid storage tank of the truck and movable between open and closed conditions.

WO97/42437 discloses a cap unit for a liquid storage tank in which a cap having a skirt is pivotable between open and closed conditions about a vertical axis. The cap and skirt have respective claw-formed catching means adapted to fix the cap in relation to the skirt. The cap has driving means for causing the cap to swing and an inflatable sealing ring mounted in the cap for sealing against the upper surface of the skirt when the cap covers the aperture.

BRIEF SUMMARY OF THE DISCLOSURE

In a first aspect of the invention there is provided a fill cover assembly for a liquid fuel storage tank of a road tanker, the assembly comprising:

a seat member having a frame, the frame defining a fill aperture, the frame being configured to be fixedly coupled to a base plate of a liquid storage tank, the base plate having a plate aperture formed therein, thereby to form a fluid-tight seal between the seat member and the base plate around said plate aperture; and a fill-cover coupled to the tank and arranged to be moveable with respect to the frame between a closed condition in which a fluid-tight seal is formed between the fill-cover and the frame and an open condition in which fluid may be passed through said fill aperture to fill said storage tank, wherein the assembly is further arranged to allow venting of pressurised fluid from the liquid storage tank in the event that a pressure of the fluid exceeds a prescribed value.

Embodiments of the invention have the advantage that because the fill-cover does not seal directly to the base plate, deformation of the base plate due to a build-up of high pressure within the storage tank does not affect the integrity of the seal between the fill-cover and the base plate. Rather, the fill-cover seals to the rigid seat member which in some embodiments is in turn fixedly (permanently) sealed to the base plate.

By permanently sealed includes embodiments in which the seat member is not removed every time it is required to fill the tank with liquid; thus embodiments in which the seat member is fixed to the base plate by mechanical fixings such as a plurality of bolts that are in principle removable is included.

The use of a base plate (or 'man-lid') has the advantage that an operative can enjoy improved access to an interior of the storage tank when maintenance is required. Thus, when such access is required the operative removes the base plate, whereby an aperture in the tank is provided that is larger than would be the case if the frame of the seat member were attached directly to an aperture formed in a wall of the storage tank.

The feature that the assembly is arranged to allow venting of pressurised fluid from the liquid storage tank in the event that a pressure of the fluid exceeds a prescribed value has the advantage that rupture of a tank due to a build up of excessive pressure may be prevented. Thus the presence of an emergency pressure relief functionality as part of the assembly eliminates the requirement to provide a separate emergency pressure relief valve (EPRV). Thus the number of holes required to be formed in a storage tank in order to accommodate filling of the tank and an EPRV may be reduced in some embodiments of the invention.

None of the prior art devices described herein disclose a fill cover arranged to relieve an excess of pressure that may develop in the storage tank.

Preferably the fill cover is movable with respect to the frame thereby to allow venting to take place.

The fill cover is preferably a floating fill cover. The assembly may comprise at least one resilient member arranged to urge the fill-cover against the seat member when the fill cover is in the closed condition, the assembly being arranged to allow the fill-cover to be displaced away from the seat member against an action of the at least one resilient member when the pressure in the storage tank exceeds the prescribed value.

The frame may be provided with a flange portion having a peripheral face arranged to abut a portion of a face of the base plate around a periphery of the plate aperture, the base plate being arranged to be coupled to a liquid storage tank having an access aperture formed therein whereby the base plate forms a fluid-tight seal around the access aperture Preferably the frame is in the form of an insert member having a lip portion arranged to project from the flange portion through the plate aperture.

This has the advantage that lateral movement of the frame may be substantially prevented, for example during installation of the frame. The lip portion also assists in providing a fluid tight seal to the base plate.

Preferably the lip is provided around substantially an entire circumference of the flange portion.

The lip portion may be configured to abut an edge of the wall member defining the plate aperture.

Preferably the seat portion is arranged to be hingedly movable with respect to the frame, the frame having at least one formation arranged to be hingedly coupled to said fill-cover.

Preferably the seat portion comprises a formation hingedly coupled to a lock member, the lock member being arranged to be coupled to the fill-cover when the fill-cover is in the closed condition thereby to prevent the fill-cover from assuming the open condition.

The assembly may be provided in combination with said base plate.

The base plate may be provided in the form of a generally planar member having a pair of opposed major faces, the base plate being configured to be coupled to the wall of a storage tank to form a fluid-tight seal with either of said major faces facing into said storage tank.

Preferably the seat member is configured to be attachable to the base plate in one of a plurality of rotational orientations.

Preferably the seat member is provided with a plurality of holes in said flange portion of the seat member, the holes being arranged to receive fixing elements thereby to fix said seat member to said base plate. The assembly may be designed to require the fixing elements to be passed through a wall of the base plate or tank from an opposite side of the tank to that to which the flange portion is applied.

Said holes are preferably tapped blind holes.

Preferably said blind holes are provided with an opening at said peripheral face.

Preferably a plurality of corresponding raised portions are provided on an opposite side of the seat member frame to the holes to provide an increased depth of said holes in said frame. The raise portions of the seat member frame may be provided in the form of a crenellated structure.

The seat member may be provided with a seal element arranged to provide the fluid-tight seal between the fill-cover and the frame.

A barrier member is preferably provided, the barrier member being arranged to prevent a free end of a fill arm from being lowered onto the seal member, the barrier member comprising a skirt member formed around at least a portion of the fill aperture.

Preferably the skirt member is formed around substantially the entire circumference of the fill aperture.

Preferably the skirt member is provided with at least one opening arranged to allow passage of fluid therethrough, said fluid being forced out from said fill aperture under pressure when said fill-cover is in the closed condition.

The barrier member may be provided by said raised portions.

Alternatively the barrier member may be provided by said raised portions in combination with a shield element, the shield element bridging peaks of said raised portions whereby a plurality of apertures are defined by gaps between respective pairs of mutually adjacent raised portions.

Preferably the peripheral face of the flange member is substantially flat.

The plate member may have a diameter in the range from around 15 to around 25 inches (around 38.1 cm to around 63.5 cm).

Preferably the plate member has a diameter of substantially 21 inches (53.3 cm).

The fill-cover may have a diameter in the range from around 5 inches to around 15 inches (around 12.7 cm to around 38.1 cm)

Preferably the fill-cover has a diameter of substantially 10 inches (25.4 cm)

Preferably the seat member is a cast member.

The fill-cover may be made from case aluminium.

Preferably the seat member is a substantially rigid member.

In some embodiments, the seat member is arranged to be more resistant to deformation than the plate member to which the seat member is attached. The resistance to deformation may refer to a bending about an axis parallel to a plane of the base plate.

The seat member is preferably arranged not to deform sufficiently to affect an integrity of a seal between the fill-cover and the seat member when a pressure in the storage tank rises to around 126 psi and then falls back to atmospheric pressure.

The seat member may comprise an annular member.

In a second aspect of the invention there is provided a fluid storage tank comprising an assembly according to the first aspect.

Preferably the tank is for containing a substance that is in substantially liquid form at standard temperature and pressure.

The tank may be for storing mid and high distillates.

By the term mid distillate is included diesel and kerosene.

By the term high distillate is included liquid petroleum and naphtha.

In a third aspect of the invention there is provided a tank according to the second aspect of the invention containing a liquid fuel.

The tank may contain at least one distillate being a mid or high distillate.

In a third aspect of the invention there is provided a road tanker comprising a fluid storage tank according to the second aspect.

In an aspect of the present invention there is provided a fill cover assembly for a road tanker liquid storage tank, the assembly comprising: a seat member having a frame, the frame defining a fill aperture, the frame being configured to be coupled to a base plate having a plate aperture formed therein thereby to form a fluid-tight seal between the seat member and the base plate around said plate aperture, the frame having a flange portion having a peripheral face arranged to abut a portion of a face of the base plate around a periphery of the plate aperture, the base plate being arranged to be coupled to a liquid storage tank having an access aperture formed therein whereby the base plate forms a fluid-tight seal around the access aperture; and a fill-cover arranged to be moveable with respect to the frame between a closed condition in which a fluid-tight seal is formed between the fill-cover and the frame and an open condition in which fluid may be passed through said fill aperture to fill said storage tank.

In some embodiments the seat member is in the form of an annular member.

BRIEF DESCRIPTION OF THE DRAWINGS

Embodiments of the invention will now be described with reference to the accompanying figures in which.

DETAILED DESCRIPTION

Figure 1:
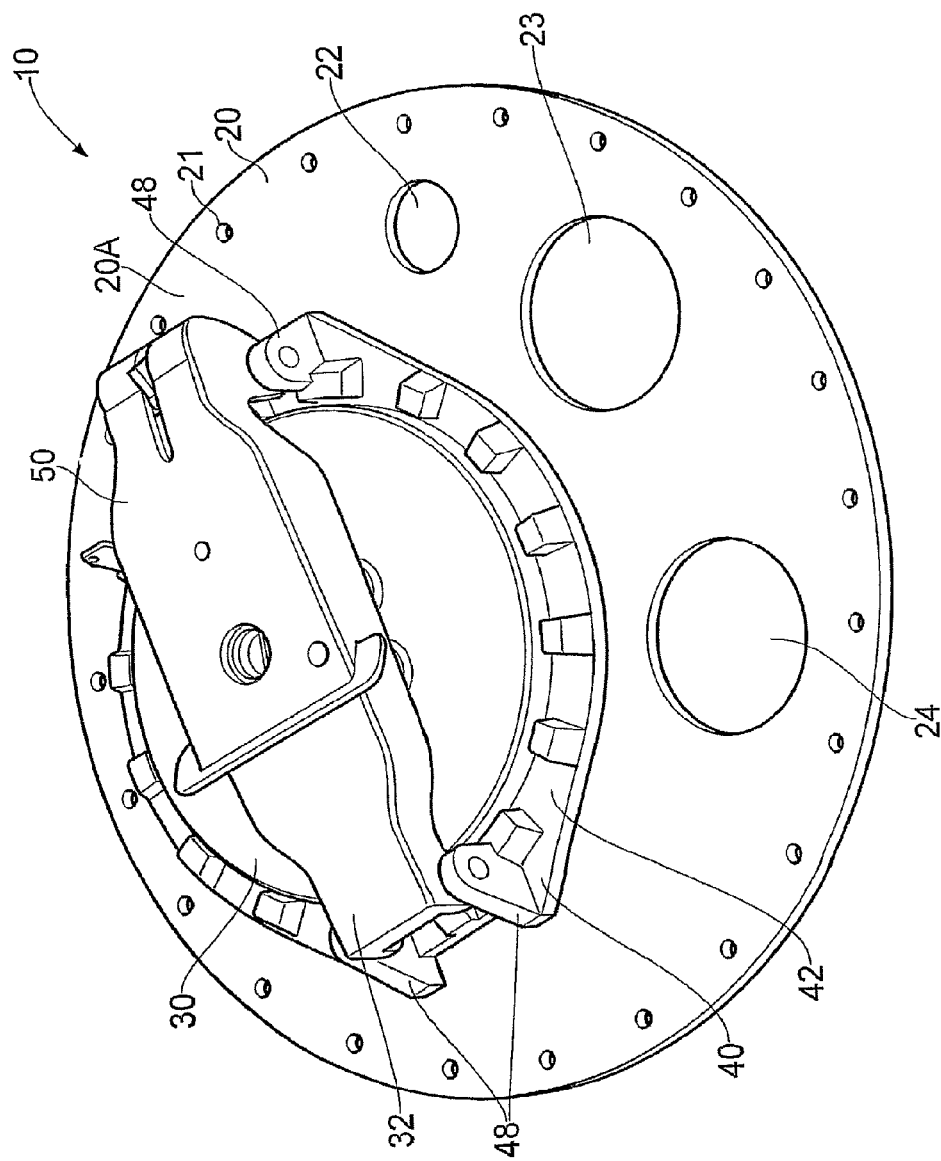
FIG. 1 shows an embodiment of the invention from above in which a fill cover member is provided in a closed condition with respect to an opening in a man-lid member to be fitted to a storage tank.
Figure 2:
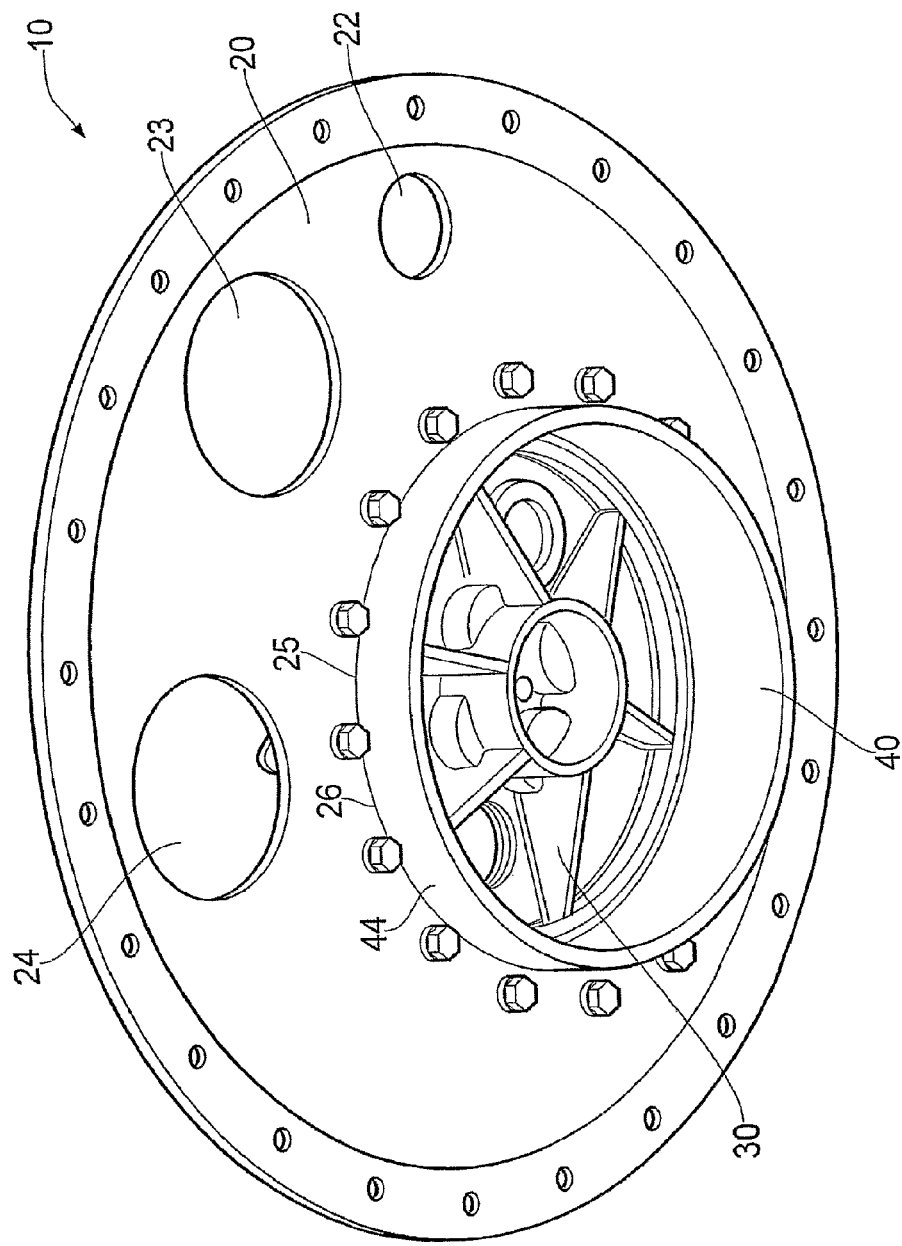
FIG. 2 shows the embodiment of FIG. 1 from below.
Figure 3:
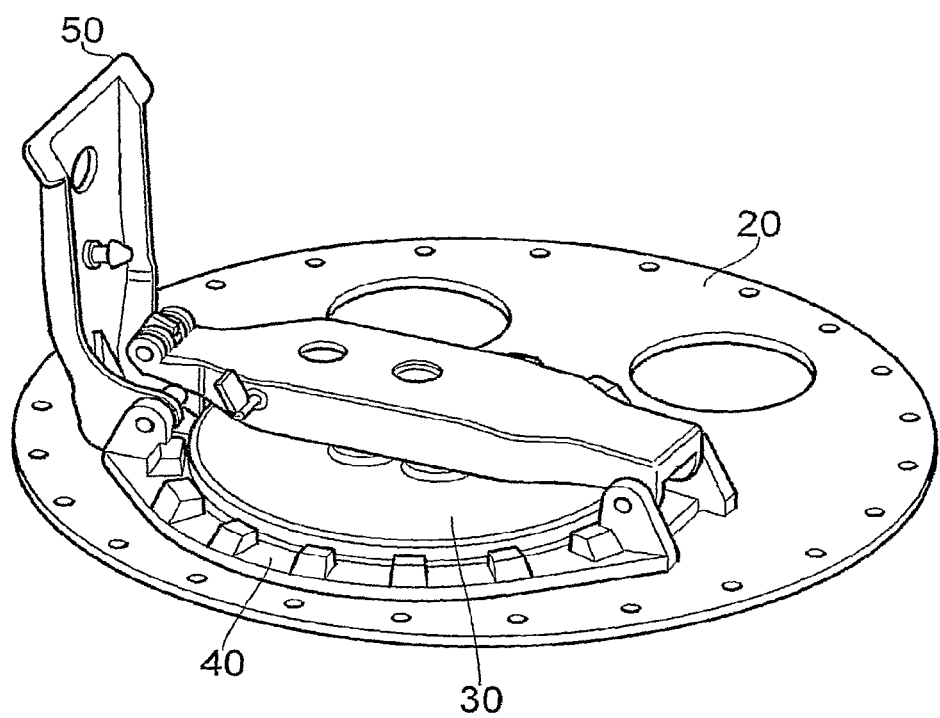
FIG. 3 shows the embodiment of FIG. 1 with a closure arm in an open position.
Figure 4:
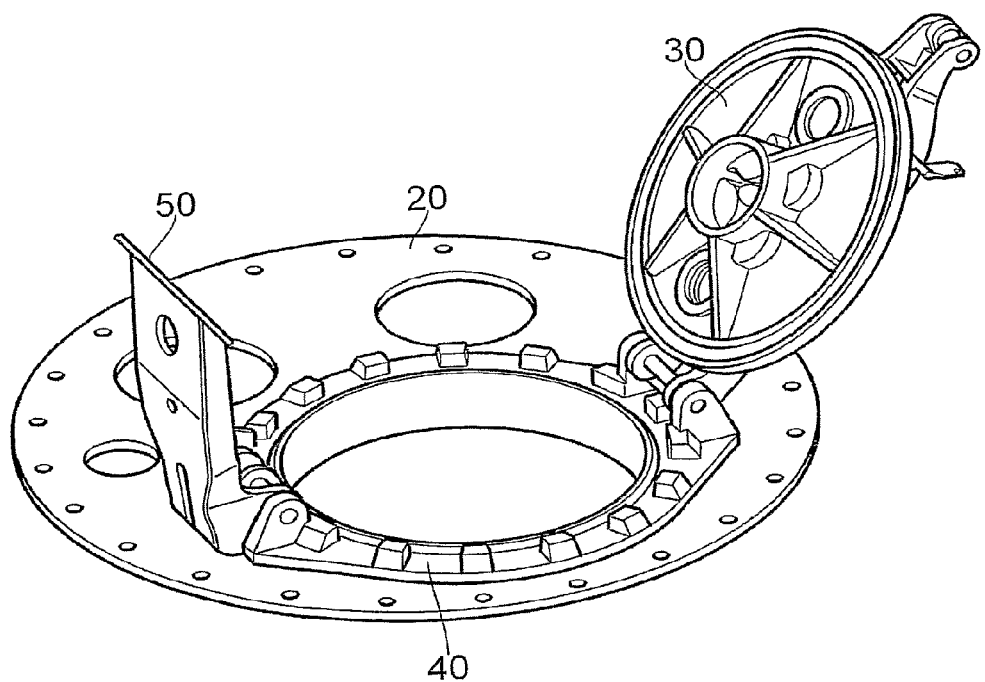
FIG. 4 shows the embodiment of FIG. 1 with the closure arm and fill cover member in open positions.
Figure 5:
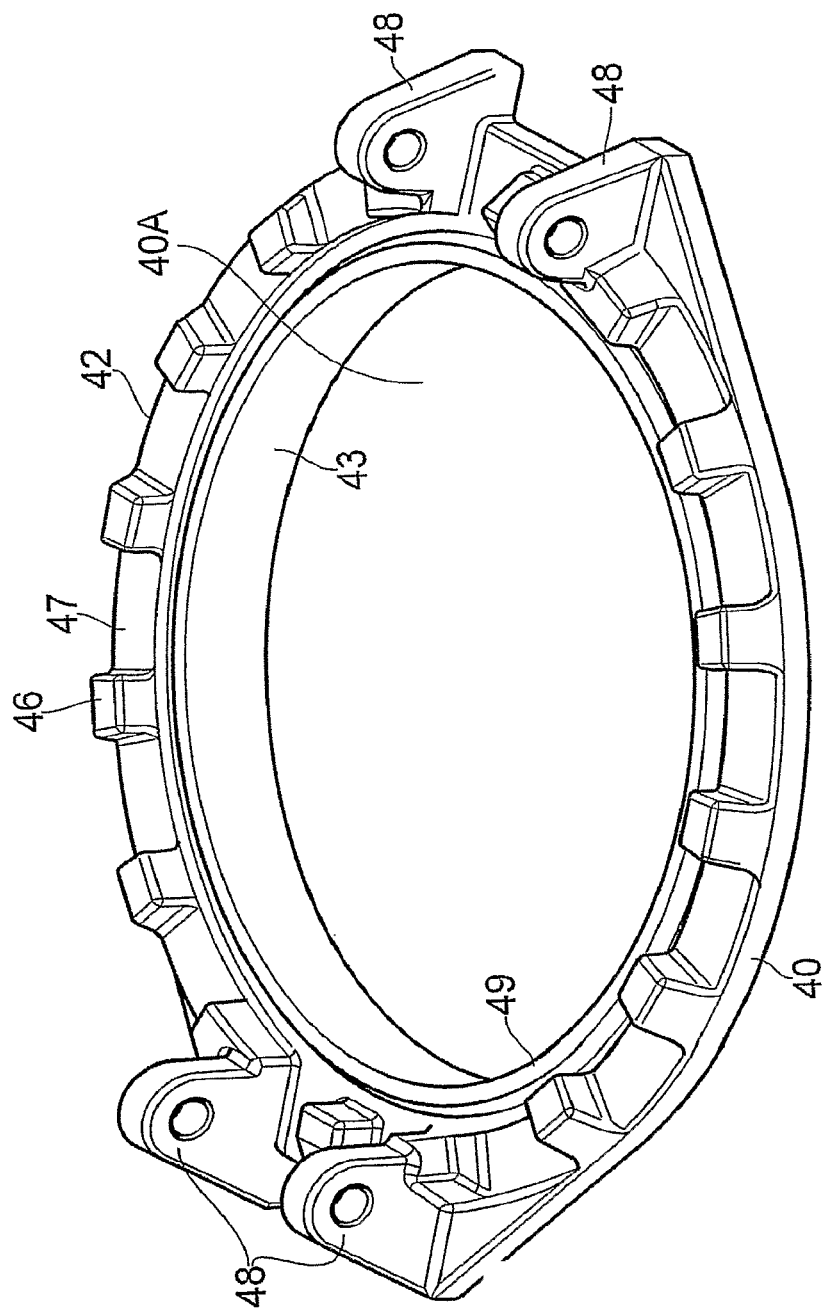
FIG. 5 shows a seat member of the embodiment of FIG. 1 from above.

In one embodiment of the invention a road tanker fluid storage tank has closure apparatus as shown generally at 10 in FIG. 1 and FIG. 2. The apparatus has a man-lid member 20 (or 'wall member') configured to be attached to a wall of the fluid storage tank to seal an aperture formed in the tank to allow filling of the tank with fluid. A periphery 21 of the man-lid member 20 is arranged to form a fluid-tight seal around a periphery of the aperture.

The man-lid member 20 has access apertures 22, 23, 24, 25 provided therethrough. The apertures 22 to 24 are arranged to allow access to an interior of the fluid storage tank by one or more sensors, pressure relief valves and/or other equipment. Aperture 25 is arranged to allow a fill-cover 30 to be fitted to the man-lid member 20. In the embodiment shown in FIGS. 1 to 6 the fill-cover 30 is coupled to the man-lid member 20 by means of seat member 40.

Seat member 40 is an annular member having a flange portion 42 having a generally flat circumferential face 42F (FIG. 6) provided in a generally radial plane with respect to aperture 25. A lip portion 43 of the seat member 40 projects from an inner radial edge of the flange portion 42 in a direction generally normal to face 42F, a radially inner face of the lip portion 43 defining an outer circumferential boundary of seat member aperture 40A.

The seat member 40 is arranged to be fitted to the man-lid member 20 such that face 42F of the flange portion 42 of the seat member 40 is in abutment with the man-lid member 20, a radially outer circumferential edge 44 of the lip portion 43 being provided in juxtaposition with an edge 26 defining the aperture 25 of the man-lid member 20 (see FIG. 2).

Figure 6:
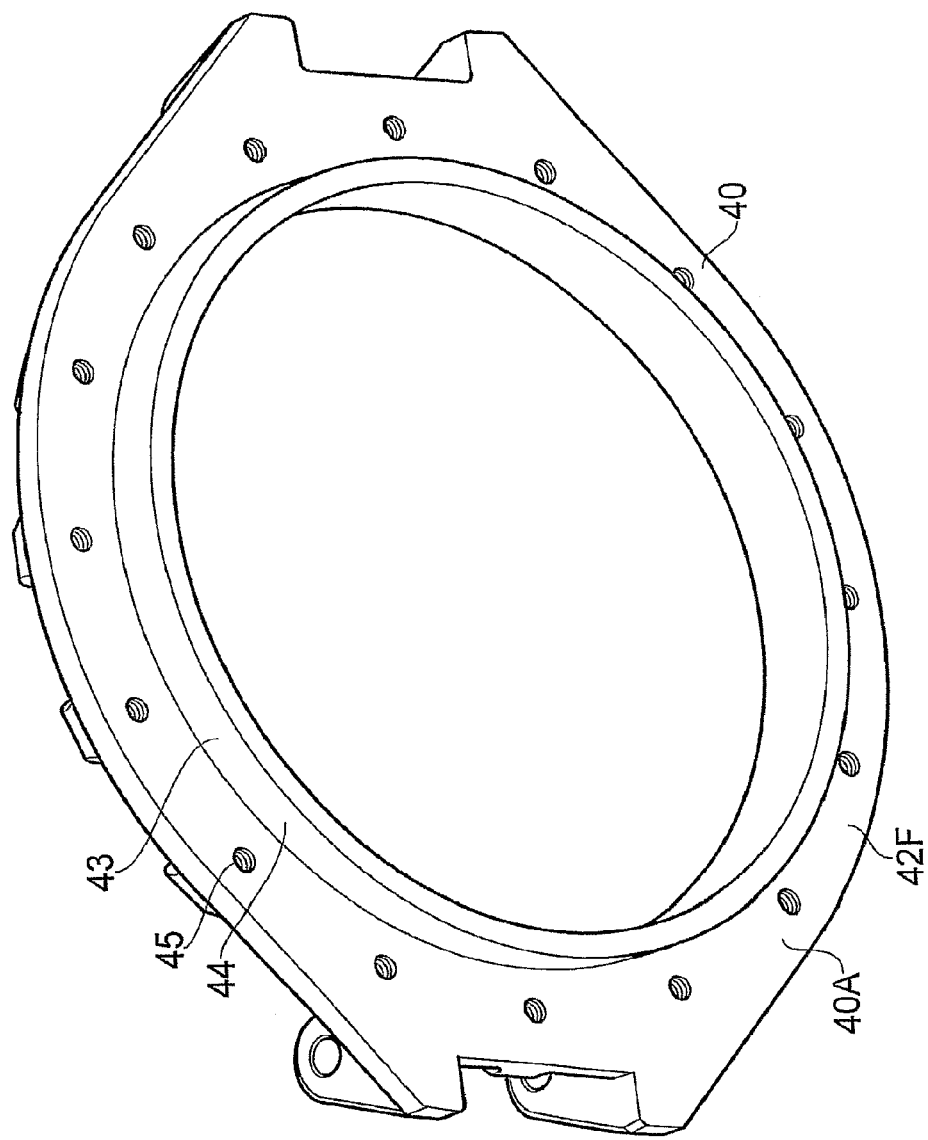
FIG. 6 shows the seat member of FIG. 5 from below.

As shown in FIG. 6, the flange portion 42 of the seat member 40 has a series of circumferentially spaced blind holes 45 provided therein from face 42F. The holes are tapped and arranged to receive a bolt passed through a wall of the man-lid member 20 whereby the seat member 40 may be attached to the man-lid member 20. Raised protrusions 46 are provided on an outer face 47 of the flange portion 42 on an opposite side of the seat member 40 to the face 42F at positions corresponding to those of the holes 45. The protrusions 46 (which may be referred to as crenelations in some embodiments due to their topographical appearance) provide a local increase in thickness of the flange portion 42 to accommodate the blind holes 45. The presence of the protrusions 46 allows a suitable depth of blind hole 45 to be provided whilst allowing an amount of material required to construct a seat member 40 to be reduced. A corresponding reduction in a weight of the seat member 40 is advantageously obtained.

The feature that the seat member 40 is provided with circumferentially spaced holes 45 has the advantage that the orientation of the seat member 40 with respect to the man-lid member 20 is indexed, thereby allowing an orientation of the seat member 40 with respect to the man-lid member 20 to be chosen according to the requirements of a particular installation.

The seat member 40 (FIG. 5) is also provided with two pairs of support elements 48 on diametrically opposite sides of the flange portion 42. The support elements 48 are arranged in pairs, each pair having an aperture formed therethrough arranged to support a spindle. The elements 48 are arranged whereby a support arm 32 attached to a fill-cover 30 can be hingedly coupled to one of the pairs of elements 48, and a closure arm 50 may be hingedly coupled to the other pair of elements 48.

In the embodiment shown in FIGS. 1 to 6 the two pairs of support elements 48 are substantially identical. In some embodiments the two pairs of support elements 48 are different. Other arrangements are also useful.

The support arm 32 is coupled to the fill-cover 30 and is operable to swing from a closed position, in which the fill-cover 30 is positioned in juxtaposition with an annular seal element 49 of the seat member 40 and an open position in which the fill-cover 30 is positioned away from the seal element 49 to allow filling of the tank with fluid. In the closed condition a fluid-tight seal is formed between the fill-cover 30 and the seal element 49.

The closure arm 50 and support arm 32 are provided with complementary interengaging formations whereby when the support arm 32 is in a closed condition the closure arm 50 may be secured to the support arm 32 thereby to prevent movement of the support arm 32 from the closed position.

The positions of apertures 22 to 24 of the man-lid member 20 are arranged to allow convenient mounting of items such as a pressure relief valve, liquid level gauge head, dip stick access cover, and/or other apparatus.

Figure 7:
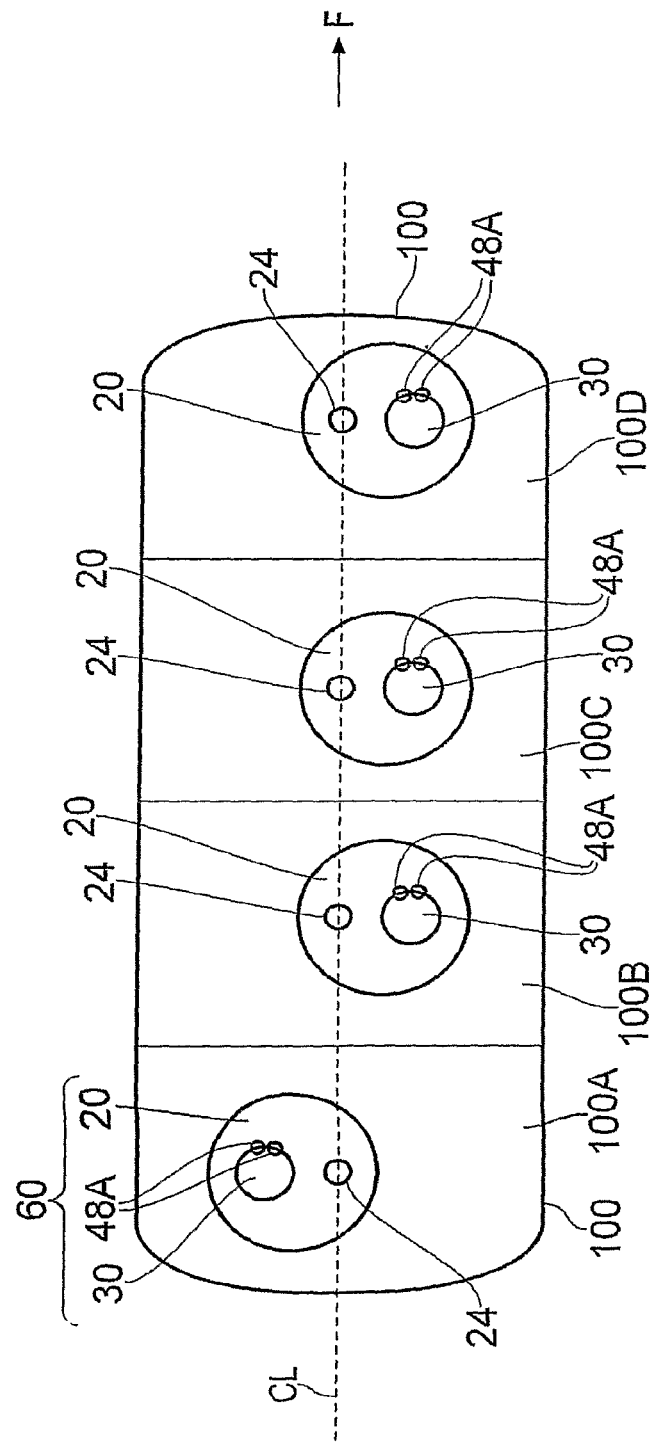
FIG. 7 shows a plan view of a storage tank having four sub-tanks.

FIG. 7 shows a storage tank 100 of a road tanker having four man-lid members 20, seal members 40 and fill-covers 30 each fitted to a different respective sub tank 100A to D of the storage tank 100.

In fitting the man-lid members 20 to a storage tank 100 it is sometimes required to position one or more of the man-lid members 20 at a different location with respect to a centreline CL of the storage tank compared with other man-lid members 20. This may for example be due to the nature of the construction of a given storage tank 100, and/or the number of compartments of the storage tank 100.

In the embodiment of FIG. 7 a man-lid member 20 fitted to sub-tank 100A is positioned whereby the fill-cover 30 is located to the left of the tank centreline CL (relative to an observer facing in a direction of forward movement F of the storage tank 100). In contrast, man-lid members 20 fitted to sub-tanks 100B to D are positioned whereby their respective man-lids 30 are located to the right of the tank centreline CL.

Regardless of the position of a man-lid member 20, in some embodiments a dip-stick aperture 24 of each man-lid member 20 must be positioned over a volumetric centre of the sub-tank in order to allow a dip-stick or other measuring device to be directed to the volumetric centre from substantially directly above the volumetric centre in order to measure a level of liquid in the storage tank.

A further constraint exists that the support arm 32 of the fill-cover 30 must be positioned at a location and in an orientation whereby if the support arm 32 is in an open position when a road tanker begins to move in the forward direction F, the support arm 32 will tend to pivot towards the closed position due to inertia or movement of air as the tanker moves.

Dip-stick aperture 24 is provided in man-lid member 20 at a location such that both of the above constraints can be met regardless of the location with respect to the tank centreline of the man-lid member 20. This is at least in part because the man-lid member 20 is configured such that it can be fitted to the wall of the tank 100 with either of its major faces facing away from the tank 100. In other words, the man-lid member 20 may be flipped from a first orientation to a second orientation that is an 'upside down' orientation relative to the first orientation.

Furthermore, because the seat member 40 has a plurality of holes formed therein for attachment of the seat member 40 to the man-lid member 20, the man-lid member 20 having a plurality of corresponding holes, the seat member 40 may be rotated with respect to the man-lid member 20 in order to meet the requirement that the support arm 32 of the fill-cover 30 must tend to move towards a closed position when the tanker moves in a forward direction F.

Thus, by careful choice of orientation of the man-lid member 20 and seat member 40 the above constraints regarding the position of the dip-stick aperture 24 and support arm 32 may be met.

In the embodiment of FIGS. 1 to 6 the flange portion 42 is formed from the same material as the storage tank. In some embodiments (such as liquid fuel storage tanks) the storage tank and flange portion 42 may be formed from pressed aluminium.

In some embodiments the flange portion 42 and fill-cover 30 are made from steel. Other materials are also useful. In the embodiment shown in the figures the seat member 40 is formed from cast aluminium. Other materials are also useful. Other methods of forming the seat member 40 are also useful.

In the embodiment of FIGS. 1 to 6 the aperture 40A in the seat member 40 is around 10 inches in diameter (25.4 cm). Other sizes of aperture 40A are also useful.

In some embodiments of the invention the seat member 40 is attached directly to the wall of a liquid storage tank without the presence of a man-lid member 20.

In some embodiments of the invention, a barrier member 200 is provided to protect the seal element 49 from impingement by a fill arm of fuel dispensing apparatus.

This is at least in part because the problem exists that a fill arm from which fuel is dispensed into the storage tank may be accidentally dropped or otherwise caused to impinge upon seal element 49 by an operator thereby causing damage to the seal element.

Figure 8:
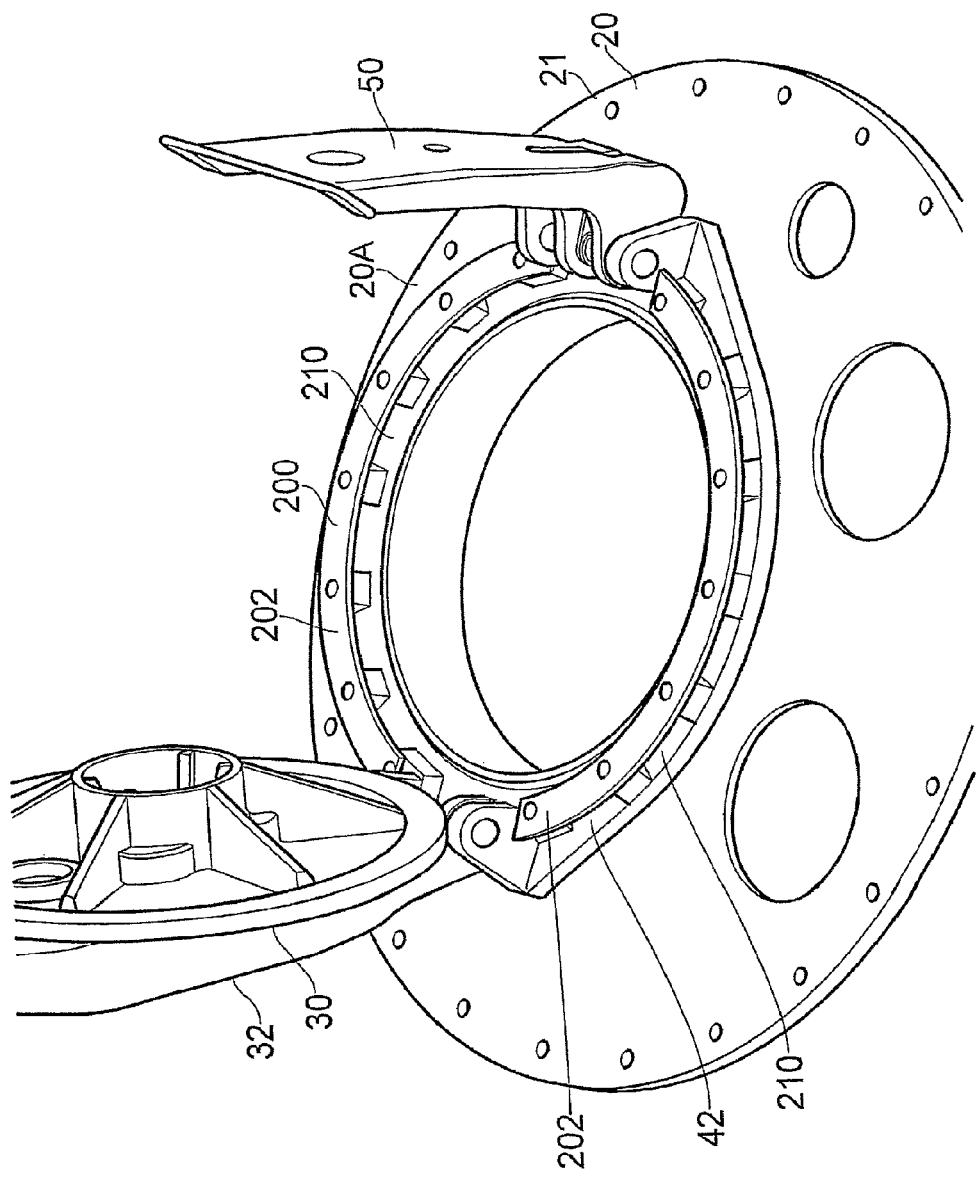
FIG. 8 shows an embodiment of the invention having a barrier member.

In order to reduce a risk of such damage, barrier member 200 is provided over the protrusions (crenelations) 46, as shown in FIG. 8.

In the embodiment of FIG. 8 the barrier member 200 is in the form of a pair of curved plate elements 202 coupled to upper faces of the protrusions 46.

In some embodiments, the barrier member is in the form of a generally solid skirt member that replaces the protrusions 46, the blind holes 45 being formed in the skirt member. The skirt member may be integrally formed with the seat member 40, such as by casting or machining. Alternatively or in addition a barrier member may be provided not having holes formed therein.

The embodiment of FIG. 8 has the advantage over a generally solid skirt member that if the tanker is dropped from a height sufficient to cause momentary leakage of liquid and/or vapour from the fill-cover 30 under conditions of high pressure (i.e. leakage between the fill-cover 30 and the seal element 49), the liquid and/or vapour is able to escape through gaps 210 between the barrier member 200 and flange portion 42.

Without this feature, a build-up or pressure might otherwise occur that would be sufficient to cause rupture of the tank or one or more portions of the closure apparatus 10.

Fill cover assemblies according to some embodiments of the invention have the advantage that a road tanker storage tank for transport of flammable liquids to which the fill-cover assembly is fitted may be dropped in a drop test from a prescribed height of around 1.2 m when filled with liquid and retain an integrity of the seal between the fill cover and the seat member after dropping. In some embodiments a fill-cover assembly that has passed a national standard drop test such as a UK drop test is entirely reusable following the drop test. In some embodiments of the invention the same storage tank with the same fill-cover assembly may be dropped a plurality of times, after which the fill-cover assembly is still safe to be re-used.

In some embodiments of the invention, apertures provided in a skirt member of the seat member allow fluid forced from the seat member aperture during a course of a drop test to be released without generating a back-pressure on fluid contained within the tank. This has the advantage that a likelihood of a rupture of a tank is reduced.

This is in contrast to prior art fill-cover apparatus in which the fill-cover is hingedly coupled directly to a man-lid. Flexure of the man-lid due to a sudden and substantial increase in fluid pressure during a course of a drop-test typically leads to permanent deformation of the man-lid following which replacement of the man-lid is required.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A fill cover assembly for a liquid fuel storage tank of a road tanker, the assembly comprising:
   a base plate;
   a seat member having a frame, the frame defining a fill aperture, the frame configured to be fixedly coupled to the base plate of a liquid storage tank, the base plate having a plate aperture formed therein; and
   a fill-cover coupled to the frame and arranged to be moveable with respect to the frame between a closed condition and an open condition;
   wherein in the closed condition, a fluid tight seal is formed between the fill cover and the seat member whereby there is no venting of pressurized fluid from the liquid storage tank when a pressure of the fluid is below a prescribed value, and in the open condition, fluid may be passed through said fill aperture to fill said storage tank;
   wherein the frame of the seat member is in the form of an insert member having a flange portion with a peripheral face arranged to abut a portion of a face of the base plate around a periphery of the plate aperture and a lip portion arranged to project from the flange portion through the plate aperture;

wherein the lip portion is configured to abut an edge of the wall member defining the plate aperture so that the flange portion forms a fluid tight seal between the seat member and the base plate of the liquid storage tank around said plate aperture;

wherein the base plate is arranged to be coupled to a liquid storage tank having an access aperture formed therein and forms a fluid tight seal around the access aperture; and wherein the assembly is further arranged to allow venting of pressurized fluid from the liquid storage tank in the even that a pressure of the fluid exceeds said prescribed value when the fill cover is in a closed condition.

2. An assembly as claimed in claim 1, wherein the fill cover is movable with respect to the seat member thereby to allow venting to take place.

3. An assembly as claimed in claim 1, wherein the fill cover is a floating fill cover.

4. An assembly as claimed in claim 1 further comprising at least one resilient member arranged to urge the fill-cover against the seat member when the fill cover is in the closed condition, the assembly being arranged to allow the fill-cover to be displaced away from the seat member against an action of one of the at least one resilient members when the pressure in the storage tank exceeds the prescribed value.

5. An assembly as claimed in claim 1, wherein the lip is provided around substantially an entire circumference of the flange portion.

6. An assembly as claimed in claim 1, wherein the fill-cover is arranged to be hingedly movable with respect to the frame, the frame having at least one formation arranged to be hingedly coupled to said fill-cover.

7. An assembly as claimed in claim 1, wherein the seat member comprises a formation hingedly coupled to a lock member, the lock member being arranged to be coupled to the fill-cover when the fill-cover is in the closed condition thereby to prevent the fill-cover from assuming the open condition.

8. An assembly as claimed in claim 1, wherein the base plate is in the form of a generally planar member having a pair of opposed major faces, the base plate being configured to be coupled to the wall of a storage tank to form a fluid-tight seal with either of said major faces facing into said storage tank.

9. An assembly as claimed in claim 8, wherein the seat member is configured to be attachable to the base plate in one of a plurality of rotational orientations.

10. An assembly as claimed in claim 9, wherein the seat member is provided with a plurality of holes in said flange portion of the seat member, the holes being arranged to receive fixing elements thereby to fix said seat member to said base plate.

11. An assembly as claimed in claim 10, wherein said holes are tapped blind holes.

12. An assembly as claimed in claim 11, wherein said blind holes are provided with an opening at said peripheral face.

13. An assembly as claimed in claim 10, wherein a plurality of corresponding raised portions are provided on an opposite side of the seat member frame to the holes to provide an increased depth of said holes in said frame.

14. An assembly as claimed in claim 1, wherein the seat member is provided with a seal element arranged to provide the fluid-tight seal between the fill-cover and the frame.

15. An assembly as claimed in claim 14 further comprising a barrier member, the barrier member being arranged to prevent a free end of a fill arm from being lowered onto the seal member, the barrier member comprising a skirt member formed around at least a portion of the fill aperture.

16. An assembly as claimed in claim 15, wherein the skirt member is formed around substantially the entire circumference of the fill aperture.

17. An assembly as claimed in claim 15, wherein the skirt member is provided with at least one opening therein arranged to allow passage of fluid therethrough, said fluid being forced out from said fill aperture under pressure when said fill-cover is in the closed condition.

18. An assembly as claimed in claim 1, wherein the plate member has a diameter in the range from around 15 to around 25 inches (around 38.1 cm to around 63.5 cm).

19. An assembly as claimed in claim 18, wherein the plate member has a diameter of substantially 21 inches (53.3 cm).

20. An assembly as claimed in claim 1, wherein the fill-cover has a diameter in the range from around 5 inches to around 15 inches (around 12.7 cm to around 38.1 cm).

21. An assembly as claimed in claim 20, wherein the fill-cover has a diameter of substantially 10 inches (25.4 cm).

22. An assembly as claimed in claim 1, wherein the seat member is a cast member.

23. An assembly as claimed in claim 1 formed from aluminium.

24. An assembly as claimed in claim 1, wherein the seat member is arranged not to deform sufficiently to affect an integrity of a seal between the fill-cover and the seat member when a pressure in the storage tank rises to a around 126 psi and then falls back to atmospheric pressure.

25. An assembly as claimed in claim 1, wherein the seat member comprises an annular member.

26. A fluid storage tank comprising an assembly as claimed in claim 1.

27. A tank as claimed in claim 26 for containing a substance that is in substantially liquid form at standard temperature and pressure.

28. A tank as claimed in claim 26 containing a liquid fuel.

29. A tank as claimed in claim 26 containing at least one distillate being a mid or high distillate.

30. A road tanker comprising a fluid storage tank as claimed in claim 26.

31. An assembly as claimed in claim 1, wherein the fill aperture is adjacent to and fixedly coupled to the base plate.

* * * * *

UNITED STATES PATENT AND TRADEMARK OFFICE
CERTIFICATE OF CORRECTION

PATENT NO. : 8,608,021 B2 Page 1 of 1
APPLICATION NO. : 12/918657
DATED : December 17, 2013
INVENTOR(S) : Trevor Poulter It is certified that error appears in the above-identified patent and that said Letters Patent is hereby corrected as shown below:

In the Claims

Column 9, line 16, the term 'even' in Claim 1 should read -event-.

Signed and Sealed this
Twenty-second Day of July, 2014

Michelle K. Lee
*Deputy Director of the United States Patent and Trademark Office*